United States Patent
Joseph et al.

(10) Patent No.: US 12,086,629 B1
(45) Date of Patent: Sep. 10, 2024

(54) GEOSPATIAL DATA WORKFLOW PLATFORM

(71) Applicant: Descartes Labs, Inc., Santa Fe, NM (US)

(72) Inventors: Gabriel Loren Joseph, Santa Fe, NM (US); Clark Kennith Zinzow, Santa Fe, NM (US)

(73) Assignee: Descartes Labs, Inc., Santa Fe, NM (US)

( * ) Notice: Subject to any disclaimer, the term of this patent is extended or adjusted under 35 U.S.C. 154(b) by 281 days.

(21) Appl. No.: 17/371,580

(22) Filed: Jul. 9, 2021

Related U.S. Application Data (60) Provisional application No. 63/050,720, filed on Jul. 10, 2020.

(51) Int. Cl.
  *G06F 9/48* (2006.01)
  *G06F 21/62* (2013.01)

(52) U.S. Cl.
  CPC .......... *G06F 9/485* (2013.01); *G06F 21/6218* (2013.01)

(58) Field of Classification Search
  CPC .. G06F 9/485; G06F 21/6218; G06F 11/3495; G06F 11/3006; G06F 11/3058; G06F 11/3065; G06F 11/3419; G06Q 10/0633
  See application file for complete search history.

(56) References Cited

U.S. PATENT DOCUMENTS

| | | | |
|---|---|---|---|
| 9,904,585 B1* | 2/2018 | Islam | G06F 11/0709 |
| 10,049,274 B1* | 8/2018 | Polyakov | G06F 18/2413 |
| 11,397,794 B1* | 7/2022 | Baghani | G06F 21/125 |
| 2006/0037032 A1* | 2/2006 | Synovic | G06F 9/547 |
| | | | 719/330 |
| 2007/0198586 A1* | 8/2007 | Hardy | G06F 16/29 |
| 2013/0158964 A1* | 6/2013 | Hall | G06Q 10/06 |
| | | | 703/3 |
| 2018/0165604 A1* | 6/2018 | Minkin | G06Q 10/06 |
| 2020/0151630 A1* | 5/2020 | Shakhnovich | G06Q 10/063 |
| 2022/0137939 A1* | 5/2022 | Viswanath | G06F 8/427 |
| | | | 717/144 |

* cited by examiner

*Primary Examiner* — Jorge A Chu Joy-Davila
(74) *Attorney, Agent, or Firm* — Van Pelt, Yi & James LLP (57) ABSTRACT

Executing geospatial data workflows includes receiving a representation of a first workflow. It further includes receiving a request to execute a second workflow, the second workflow including a reference to the first workflow. At least one of the first workflow and the second workflow comprises at least one geospatial transformation operation. It further includes determining that the first workflow referenced by the second workflow is permitted to be accessed. It further includes, based at least in part on determining that the first workflow is permitted to be accessed, executing the second workflow, including executing the representation of the first workflow comprising the at least one geospatial transformation operation.

25 Claims, 6 Drawing Sheets

GEOSPATIAL DATA WORKFLOW PLATFORM

CROSS REFERENCE TO OTHER APPLICATIONS

This application claims priority to U.S. Provisional Patent Application No. 63/050,720 entitled GEOSPATIAL DATA WORKFLOW PLATFORM filed Jul. 10, 2020 which is incorporated herein by reference for all purposes.

BACKGROUND OF THE INVENTION

Geospatial analyses may involve numerous steps requiring complex software engineering work to implement. Thus, creating and deploying geospatial analyses can be challenging and inefficient.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein are techniques for generating and deploying geospatial data analysis workflows. Using the geospatial workflow techniques described herein, users are provided an interface, such as an Application Programming Interface (API), that allows them to chain together and execute all of the steps needed to produce a workflow for geospatial data analysis. Using the geospatial workflow techniques described herein, a user can then capture that entire chain of steps, and publish that chain of steps as a workflow object stored to a backend such as the geospatial data workflow platform described herein. Further, using the workflow sharing techniques described herein, users may also import other users' workflows and use those workflows without knowledge of the details of how the other workflows are implemented. Further, the use of other workflows is recursive, where one user's workflow may include/import workflows created by other users. As will be described in further detail below, the geospatial workflow techniques described herein further facilitate versioning of geospatial data workflows, where, in some embodiments, versioning and package management are built into a geospatial data workflow platform itself, instead of, for example, a user versioning and sharing the code they write against the geospatial data workflow platform.

The geospatial data workflow techniques described herein provide efficient composing and deploying of geospatial analyses. Using the techniques described herein, workflows for geospatial analysis may be developed interactively, where changes to computations and algorithms may be dynamically recomputed, on the fly, and then run at scale without requiring changes to code.

Using the geospatial data workflow techniques described herein, users are able to express the "what" of their model, rather than the "how," allowing them to focus more on the science, rather than the software engineering work of implementing their desired geospatial analyses.

As will be described in further detail below, the geospatial workflow techniques herein include techniques for sharing and persistence of workflows. As will also be described in further detail below, in some embodiments, workflows are represented via a programming language. For example, a lightweight programming language specification is used as a serialization mechanism for workflows. The use of such a representation facilitates composing and sharing of workflows.

For example, as will be described in further detail below, when a user composes a workflow or function in a workflow, they write code with high-level objects. Instead of sending data back and forth, a sequence of operations defined by the user is sent to a backend (e.g., a geospatial data workflow platform, such as that described in further detail below). When a workflow is executed, the sequence of operations is processed by the backend, which provides a result back to the client/user (e.g., a composited image, a time series of statistics derived from raster and vector data, a single number, etc.). This communication of workflow representations allows workflows to scale.

As will be described in further detail below, the code that a user writes when composing their workflow (where the code the user writes is also referred to herein as "composition code" or "composition syntax") is not executed on their local device to compute a result. Instead, a representation of their composed code is sent to a backend, which runs or executes the representation of the composed code. The platform then sends back a result (or stores the result elsewhere). By doing so, various optimizations may be applied that would be difficult or impossible for a user to write on their own. Further, results may be easily viewable or rendered on a map, as will be described in further detail below.

Figure 1:
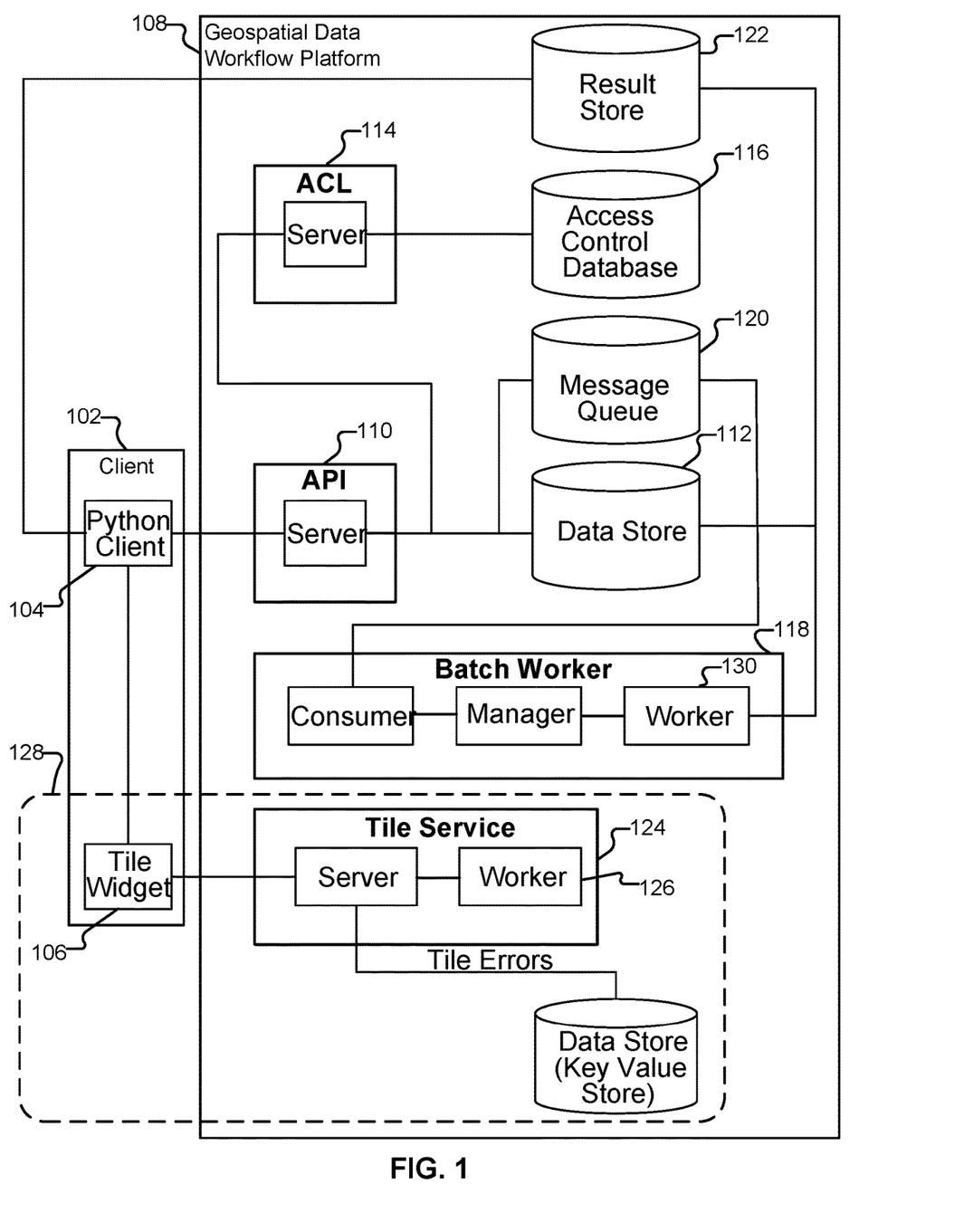
FIG. 1 illustrates an embodiment of an environment in which geospatial workflows are composed, shared, and executed.

FIG. 1 illustrates an embodiment of an environment in which geospatial data workflows are composed, shared, and executed. As will be described in further detail below, workflow composition and definition is performed on client devices, while execution of workflows is performed at the backend. As shown in this example, a client 102 communicates with geospatial data workflow platform 108. The client and platform communicate over a network such as the Internet. Examples of clients include laptops, desktops, mobile devices such as smartphones and tablets, etc. As one example, platform 108 is implemented as a scalable deployment in a Kubernetes cluster. In this example, a user of client 102 uses the client to compose, publish, and initiate execution of workflows. The workflows are published to platform 108, where they are persisted. Execution of workflows is also performed by platform 108. As will be described in further detail below, handling of workflow access privileges is also performed by platform 108.

Figure 2:
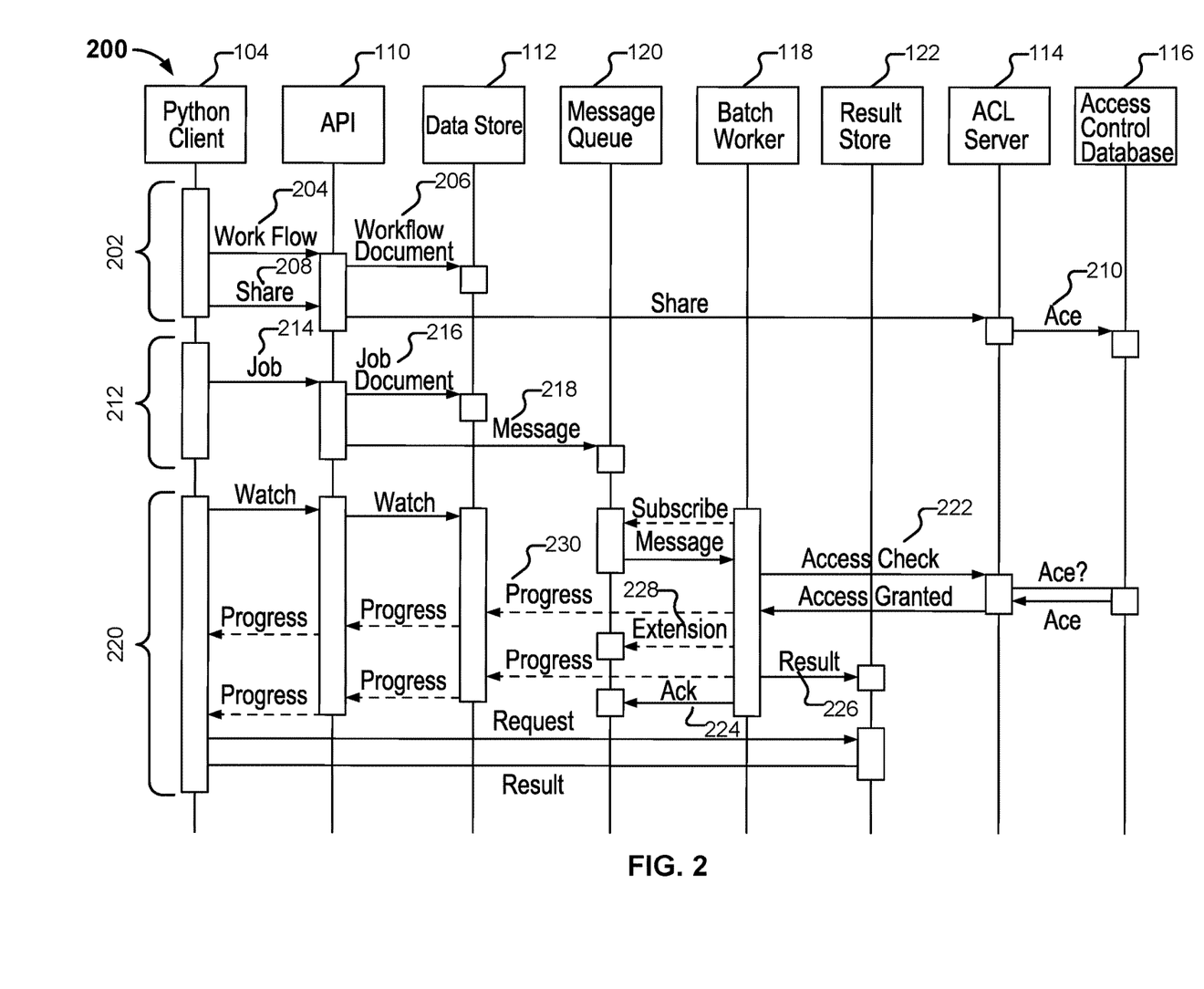
FIG. 2 illustrates an embodiment of a call flow for workflow composition, sharing, and execution.

FIG. 2 illustrates an embodiment of a call flow for workflow composition, sharing, and execution. The call flow shown in the example of FIG. 2 illustrates an example of a request and response structure between various components, such as between client 102 and platform 108, as well as among the various components of the geospatial data workflow platform.

The following are examples and embodiments of workflow composition and execution. For illustrative purposes, the examples and embodiments described below are described in conjunction with the geospatial data workflow environment of FIG. 1, as well as the call flow of FIG. 2.

Composing a Workflow

In this example, suppose that a user, Alice, has developed a workflow for performing a type of geospatial analysis. In this example, Alice uses her client device 102 to generate a workflow for geospatial analysis.

In this example, Alice writes the code for her workflow with high-level objects. For example, Alice is provided a set of tools to define the operations for her workflow, where the operations are defined as high-level objects. As one example, the high-level objects are defined via Python. Other programming languages may be used. By using an existing programming language such as Python, Alice is able to define workflows without requiring her to learn a new language or set of skills.

For example, Alice uses Python to generate an algorithm for a geospatial operation. Examples of geospatial operations include compositing, masking, etc. In this example, Alice writes her code with high-level objects such as "Image" and "ImageCollection" (which, for example, is an object representing a stack of Images). The client device includes Python client 104. Python client 104 is configured to convert Alice's user-written workflow code to a lightweight programming language specification, where Alice's code is defined or represented as a sequence of operations.

In this example, rather than Alice writing Python code that is directly executed when performing a computation, Alice writes Python code using high-level objects, rather than, for example, having to consider array indices.

Here, a focused, preconfigured subset of operations that pertain to geospatial specific domains is provided that Alice may select from to define the operations used to compose her workflow. For example, a library of higher level primitives written in Python (or any other language as appropriate) is provided to a user to call to perform geospatial operations. This includes functions for performing matrix operations, which may require bookkeeping, and various other operations (e.g., filtering, merging, and transforming raw image data). This can be tedious or difficult for a user to write in native python.

Here, the higher level primitives are provided to users to perform geospatial transformations such as applying a transformation to an entire area of interest (AOI) at once. For example, the higher level primitives or functions include mathematical operations preconfigured and predefined to operate on images or collections of images (e.g., element-wise natural log of an image or image collection, element-wise square of an image or image collection, etc.). Other examples of preconfigured geospatial operations provided to users include geospatial functions or proxies for operating on data in a format such as GeoJSON or other geographic data structures. Through the higher level primitives, the domain of various geospatial operations is expressed at a high level. In this way, a user does not need to manage how to implement the function. As will be described in further detail below, in some embodiments, the underlying "source code" used to implement the preconfigured operations and functions provided to users is maintained at the backend and is not accessible to the user.

As shown in this example, the higher level primitives are expressed in a programming language known to users, such as Python, so that a familiar programming language with known syntax may be used to define workflows. The workflows described herein are integrated with, for example, the Python data science ecosystem, allowing users to quickly build custom interactive tools on top of workflows, where users can retrieve native Python-type data to use with other libraries. Interoperability with Python allows complex numerical operations to be expressed without requiring users to learn new syntax.

By allowing coding at the level of high-level objects, the difficulty in creating workflows is abstracted from users who may not be data scientists. Further, evaluation of the workflow is simplified to a more tractable state.

For example, suppose that Alice's workflow operates on imagery and applies various types of geospatial processing and analyses, such as comparing and differencing of different frequency bands in the images to enhance or extract or detect the presence of a target. Using the library of higher-level primitives, complex operations over arbitrary areas may be expressed with a few lines of code, which, as will be described in further detail below, are evaluated on the backend, which further breaks down the workflow into a large number of operations (e.g., billions of operations) that are ultimately executed in order to perform the actual computations according to the workflow.

For example, in some embodiments, after the workflow is expressed using the high-level language on the client side, a representation of the computation defined by the workflow is saved to the backend, where the workflow can, at a later time, be applied to specific imagery in a specific geographic area at a certain resolution. However, Alice need not have written the lower-level implementation of the workflow to define the computation.

Thus, in this example, Alice is able to define the sequence of operations for her workflow by including objects and first-class functions or symbols from a library of previously defined functions.

In some embodiments, Alice's composition syntax (the code that she typed out to define the workflow), when executed, generates a serialized representation of Alice's workflow. For example, a graph or tree representation of the workflow operations, such as an Abstract Syntax Tree (AST) representation of the workflow, is generated from the Python composition code written by Alice using high-level objects. For example, a dependency graph is generated representing the Python-coded operations. In some embodiments, the dependency graph representing the operations is stored in a syntax referred to herein as "graft" that describes, for example a computation that depends on other computations. For example, the graft syntax is associated with functional directed acyclic dependency graphs. In some embodiments, in contrast to typical directed acyclic graphs, the functional directed acyclic dependency graphs are functional and can, for example, take parameters, contain subgraphs (e.g., functions with parameters), and apply those functions to values in the graph (that is, it is the abstract syntax tree of a functional programming language). Other data structure representations of the workflow code composed by a user may be used. As will be described in further detail below, the representation of the workflow is provided to backend 108. The execution of the operations defined by the workflow is performed at the backend, rather than at the client. In this way, when analysis is performed, rather than the data being operated on (e.g., pixel values of satellite imagery) being transmitted between the client and the backend, it is the descriptions of the algorithms/programs defined by the workflows that are transmitted. In the above examples, the AST representation is generated at the client. In other embodiments, the AST representation is generated at platform 108. For example, Alice's Python code may be transmitted to the platform, and the platform converts the workflow code to an AST representation.

While examples involving the use of the Python programming language to code workflows are described herein for illustrative purposes, the workflow definition techniques described herein may be variously adapted to accommodate any other type of programming language as appropriate. For example, libraries of higher-level primitives and functions for geospatial transformations for other programming languages may be generated and provided to users. Users may then use the library appropriate to the language they would like to use to define their desired workflows.

Publishing a Workflow

Now suppose that Alice would like to publish the workflow she has created. The workflow is published to the geospatial data workflow platform. In this example, Alice composes her workflow and publishes her workflow to the geospatial data workflow platform. As one example, to publish her workflow, she makes an API (Application Programming Interface) call to publish the workflow. Alice also configures sharing permissions for her workflow, as will be described in further detail below.

Configuring Workflow Access Privileges

In this example, after, or as part of, publishing her workflow, Alice also specifies access privileges for her workflow. The access privileges include specifying parameters and permissions with respect to sharing of her workflow. For example, Alice may specify various levels of restriction on the sharing of her workflow. In some embodiments, Alice specifies the sharing permission mode via a flag that indicates whether sharing of the workflow is execution-only, or whether the workflow composition code she wrote may be viewed. Other levels or types of permissions may be specified in various ways.

For example, Alice may specify that her workflow is a proprietary workflow, where other users are permitted to use her workflow, but are prohibited from viewing the workflow code that she wrote (e.g., human-readable format of the implementation of her workflow). This is referred to herein as "execution-only mode" or "private" sharing. That is, Alice's function may be shared without unveiling its implementation (where the inner workings of the function are kept private). This allows another user to build upon Alice's workflow, but in a manner in which Alice's workflow is called as a "black box" function in other users' own projects. In this execution-only mode sharing, other users are allowed to reference Alice's workflow locally, but are not able to see the workflow code that she wrote, or its AST representation. In this way, Alice allows her function to be shared by others, but is able to maintain the privacy and secrecy of the implementation of her workflow, without having the code she wrote being exposed to others.

In other embodiments, Alice may allow her workflow to be shared in a more permissive mode. As one example, Alice may share her workflow in a "free-sharing" or "public" mode. For example, with this mode, another user may be allowed to view and/or download the workflow composition code for Alice's workflow. Instead of and/or in addition to the workflow composition code, the AST representation of Alice's workflow is also viewable in the public access mode. In some embodiments, in this public sharing mode, Alice's workflow composition code may be incorporated into another user's workflow code, where her workflow code is viewable inline with the workflow code written by the other user.

Alice may also specify other access privileges, such as what individuals or entities have access to her workflow, and what access privileges those entities would have (which may be specified on an individual basis). For example, Alice may specify that she would like to share her workflow with her friend Bob. As one example, Alice does so by listing Bob (e.g., using a user identifier such as his email address) as a viewer of the workflow, and as an individual that has permission to obtain the workflow. Alice may also specify that Bob may only use the workflow in execution-only mode.

Portion 202 of call flow 200 of FIG. 2 corresponds to an embodiment of a publishing call flow. As shown in this example, Alice uses Python client 104 to compose her workflow. In this example, when Alice defines the operations for her workflow, she uses Python (other programming languages may be used). The Python code, when executed, generates a representation of her workflow code that will be evaluated later. In this example, the Python client converts or composes Alice's python code into a representation of a programming language. For example, the Python client composes Alice's Python workflow into a serialized workflow definition such as an Abstract Syntax Tree (AST).

In response to making the API call to request publishing of her workflow (e.g., workflow publishing request 204), the serialized workflow definition is transmitted from Alice's device to API server 110, which provides the API and handles Alice's publishing request, as well as other requests to platform 108. As one example, API 110 is implemented using the request protocol gRPC.

In some embodiments, as part of publishing the workflow, metadata associated with the workflow, such as a name and description, are transmitted along with the workflow. Other types of metadata or tags are also included in the data model for workflows. One example is a tag indicating a type or function of the workflow. The workflow may also be associated with metadata indicating the type of data to be used as input to the workflow, such as certain images, certain areas of interest, certain time ranges, etc. That is, in some embodiments, when Alice defines her workflow, she can also hardcode certain parameters for the workflow. In other embodiments, the input parameters for a workflow are provided by the caller of the workflow.

As shown in the example of portion 202 of the call flow, Alice configures sharing of her workflow by making a sharing request 208 to API 110 with respect to her workflow. In some embodiments, making the sharing request includes providing access control metadata regarding the type of sharing or access that has been specified for Alice's workflow (i.e., permissive mode, such as private or public mode access, for what users, as described above).

Persisting the Workflow

The AST representation of Alice's workflow is then persisted to data store 112. As one example, data store 112 is a key-value store. In some embodiments, data store 112 is implemented using Firestore. In some embodiments, a representation of the workflow is stored to data store 112. This AST representation is a type of workflow document or object 206 that is stored to data store 112. In some embodiments, the AST representation is stored in the JSON (JavaScript Object Notation) format. That is, the workflow code that Alice wrote is not stored, but rather, the abstract representation of the operations that Alice defined is stored.

Other metadata associated with the workflow that is also stored, include:

An identifier of the publisher (e.g., Alice's email address)

The list of users allowed to view the workflow. The users may be identified by an identifier such as an email address In some embodiments, the list of individuals is added to an additive Access Control List (ACL) system. In this way, a user does not obtain access to a workflow unless they are specifically allowed to have access to the workflow. Users may also be removed from having access as well.

In some embodiments, the access control information described above with respect to workflows is persisted by access control list (ACL) server 114 of FIG. 1. The access control server is configured to track access permissions. The access control information is persisted, for example, in response to executing "share" operation 208 of FIG. 2, which is executed in response to the user requesting that their workflow be shared. Here, in this example, an access control entry 210 is created by the ACL service 114 according to the sharing parameters specified by Alice for her workflow. The access control entry is placed in access control database 116. The permissions with respect to the workflow are then established and stored on the backend. In one embodiment, the access control database 116 is implemented using a Postgres database to persist the access control information.

In some embodiments, viewing/sharing permissions may also be stored on a per-individual or per-group of users basis (e.g., that one user has execution-only mode (private) viewing privileges, while another user has free-sharing (public) viewing privileges and is allowed to view the workflow code Alice wrote and/or its AST representation).

Referencing Another Workflow During Workflow Composition

In this example, suppose that Bob now wishes to compose his own workflow for another type of geospatial analysis. As part of his workflow, Bob would like to incorporate Alice's workflow in the one that he is writing. For example, Bob wishes to apply a geospatial transformation that is implemented using Alice's workflow.

Because a representation of Alice's workflow code is persisted at the backend, her workflow can be combined, integrated, or otherwise included with Bob's workflow. Here, using the workflow techniques described herein, the workflow definition (e.g., serialized sequence of operations) is being shared, rather than the actual data itself.

In this example, suppose that Alice had notified Bob that she had made a workflow that she had created, and that he has been given access to her workflow. Bob, using his computer, accesses a workflows library, and performs a search for workflows. This may include a general search for workflows that match his search criteria (e.g., keyword search). For example, in some embodiments, the geospatial data workflow platform provides a marketplace for workflows where users may search for and purchase workflows for use. In this example, Bob searches for workflows that have been shared with him. For example, Bob is signed into the library with his account, where his account user identifier matches the email address provided by Alice when she indicated that Bob is allowed to view her workflow. As one example, the list of workflows that has been shared with him is returned. Bob then obtains the identifier for Alice's workflow from the list.

In some embodiments, a workflow client on Bob's device provides a frontend (e.g., user interface (UI) or web interface) for viewing and selecting workflows. In other embodiments, the workflow client provides an API function call that the user can make from their terminal to receive a list of all workflows shared with them or that are publicly available. Thus, there are a variety of interactive ways in which a user can discover workflows, including workflows shared with them.

In this example, Bob then references, in the workflow he is composing, Alice's workflow using the identifier corresponding to Alice's workflow. For example, Bob is provided a specific "workflows use" call, which, in this example, is a keyword for hooking in Alice's function that she had defined. In this way, Alice's workflow is plugged into the workflow that Bob is composing.

In this example, suppose that Alice has specified that her workflow can only be shared in a private, execution-only mode. In this case, while Bob is able to obtain a reference to Alice's workflow, the code that Alice wrote, as well as its AST representation, are not available to him. Here, Bob is only able to reference or link Alice's workflow via its corresponding identifier. The following are examples of code for referencing and loading a saved/published workflow by id:

wf.retrieve('Alice_workflow_identifier')

wf.use("alice/workflow_identifier")

If, on the other hand, Alice had allowed her workflow to be shared in a free-sharing mode, then in some embodiments, when Bob references the workflow, he is allowed to view the workflow composition code Alice wrote and/or view the AST representation of her workflow. In some embodiments, the workflow composition code for Alice's workflow is downloaded locally to his client device, where it is then incorporated (e.g., placed inline) in the workflow he is composing.

Workflow Execution

Suppose that Bob has finished composing his workflow that references Alice's workflow, and he would now like to execute his workflow to perform geospatial analysis and compute some sort of result. In this example, Bob transmits his workflow (which has Alice's workflow incorporated by reference) to platform 108 for execution. Transmitting the workflow for execution includes providing any input parameters and arguments as specified by Bob's workflow. For example, Bob may provide a geo-context as input for the portion of his workflow that references Alice's workflow. In various embodiments, the geo-context includes spatial parameters such as an image data set, area of interest (AOI), resolution, frequency bands of interest, etc. to use when loading geospatial data. As described above, workflows may take inputs, but need not take inputs, and are dependent on the definition of the workflow and its operations.

In this example, Bob, via a frontend interface provided by the client application he is using, makes an API call to compute and evaluate his workflow. In response, his workflow is sent to the geospatial data workflow platform for evaluation.

Scheduling Job Execution

In this example, Bob's workflow is received by geospatial data workflow platform 108, where it is executed. In some embodiments, executing the workflow includes two portions: scheduling a workflow execution job, and execution of the workflow. Portion 212 of the call flow 200 of FIG. 2 illustrates an embodiment of a call flow for scheduling execution of a workflow. Portion 220 of call flow 200 illustrates an embodiment of a call flow for execution and monitoring of workflow execution.

As shown at 214, a job is requested. In this example, Bob has made, via an API call, a job request to platform 108 to execute his workflow. Here, rather than, or in addition to, saving a representation of Bob's workflow (as would be the case for publishing a workflow, as described above), Bob's workflow (which includes Alice's workflow) is evaluated. In this job being executed, Bob's workflow references Alice's workflow that she has shared with him. Bob's workflow is evaluated and run on the backend. In this example, Bob's workflow is evaluated by batch worker 118 of FIG. 1. For example, the AST representation of his workflow is executed/evaluated by worker 130 of batch worker 118. Further details regarding workflow execution are described below.

Referring to the example call flow of FIG. 2, Bob's workflow execution request is made, for example, as a call (e.g., job request 214) from his Python client to the API server 110. When the API server 110 receives the request for the job, the API server performs various actions.

For example, the API server 110 writes the representation of the execution of the workflow to data store 112. For example, a job document or object 216 is generated and stored that includes the AST representation of the workflow to be executed. In some embodiments, the job document is stored in a job portion of data store 112. As one example, the job document is implemented as a Firestore document. In some embodiments, the job object includes the AST workflow representation that represents the operations of the workflows object that is called for execution. In this example, the AST representation is generated by the client and transmitted to the backend for execution. In other embodiments, the AST representation is generated at the backend.

In this example, the API server also sends a signal to the batch worker 118 to start processing of that job. In this example, the signal is sent through a message (e.g., from API server 110 to message queue 120). For example, upon receiving the workflow execution request, API 110 publishes a signal such as message 218, which is sent to message queue 120 to trigger execution of the workflow. As one example, the message indicates that there is a new event or job to be run. As one example, the message queue is implemented using Pub/Sub.

Batch worker 118, which will perform the execution of Bob's job, is subscribed to message queue 120, and is configured to listen to the message queue, waiting for new messages to be published. That is, the batch worker looks to the message queue for work to perform. Batch worker 118 is then configured to schedule the work of evaluating the workflow program. For example, when batch worker 118 receives a new message, it adds the new job message to a queue of work that batch worker 118 is processing. In this example, batch worker 118 obtains, from the work queue, the message corresponding to Bob's job. Batch worker 118 performs a lookup of Bob's workflow. For example, batch worker 118 downloads the (AST) representation of Bob's workflow (e.g., from job document 216). If Alice's workflow was only allowed to be privately executed, then the AST representation for her workflow would be obtained at the backend (e.g., using the identifier of her workflow that was included in Bob's workflow). If Alice's workflow had been publicly available, then in some embodiments, her workflow code is placed inline with Bob's workflow code, and additional fetching of Alice's workflow would not be required.

Batch worker 118 then initiates evaluation of the workflow. In some embodiments, this includes evaluating the AST representation of Bob's workflow. In some embodiments, the batch worker checks the validity of the graph to determine that the representation is a valid program.

The batch worker then begins execution of the workflow. In this example, the sequence of operations defined in the serialized representation of Bob's workflow is performed. In some embodiments, the AST representation of the workflow composition code (the code that Bob wrote when composing his workflow) describes the set of operations or instructions to be executed, as well as the order that they are to be executed in. In some embodiments, the batch worker implements the operations of the AST by obtaining the underlying source code (also referred to herein as "workflow backend code" or "workflow source code") for an instruction included in the AST representation. The obtained source code (written in a language such as Python, for example) is then executed. As described above, a user may compose their workflow by calling pre-defined higher level functions that are provided to them. The underlying instructions or source code for implementing those higher level functions are maintained at the backend, and is not available to Alice or Bob. When a higher-level instruction in the AST is reached during execution, the corresponding source code is obtained and executed by the batch worker.

In this example, Bob's workflow has incorporated Alice's workflow by reference. In some embodiments, the worker verifies whether Bob is permitted to use Alice's workflow. This includes communicating with the ACL server 114 to perform an access check, as shown at 222 to determine permissions pertaining to Alice's workflow. In this way, the batch worker ensures that Bob, who is attempting to utilize Alice's workflow, is checked for access permissions when executing Alice's workflow. This includes checking the access control entry for Alice's workflow and the corresponding access control information stored to access control database 116.

In this example, when the reference to Alice's workflow is reached, the definition for her workflow is obtained from the data store (e.g., via the identifier of Alice's workflow). Alice's workflow is then executed by the backend, and the results used in Bob's workflow.

In this example, Alice's workflow was shared in a more restricted, "execution-only" mode. In this example, the workflow code that Alice had typed out and its AST representation are not returned or otherwise made available to Bob. In some embodiments, in the private or execution-only mode, the backend provides a secure context where Alice's workflow is obtained and evaluated, but Bob is unable to view the implementation of Alice's workflow. For example, at execution time, the representation of Alice's workflow is obtained and pulled into the execution of Bob's workflow at the backend, and is not made available to bob's client device.

That is, in this example of private mode sharing, Bob was able to reference Alice's workflow locally on his own computer, but when his job was executed, he was unable to see the workflow code Alice wrote, as it was obscured from him by being executed on the backend.

When the job is completed, the batch worker sends an acknowledgment 224 to message queue 120 indicating that the job is completed. As shown in this example, result 226 of the computation of his workflow is persisted to a results data store 122 (e.g., a blob store such as a Google Cloud Storage (GCS) bucket). The client is then directed to the data store to fetch the results of the computation. Results may be sent to other destinations as well, based, for example, on format.

In some embodiments, when the batch worker receives a message from message queue 120 to perform the work, the message queue has an expectation of an amount of time to be taken for the work to be completed. In some embodiments, if the batch worker has not completed the job within the expected amount of time, the worker sends an extension message 228 to the message queue indicating that additional time is needed to complete the job.

Monitoring the Progress of Workflow Execution

In some embodiments, as the job progresses, updates reflecting or indicating the current state of the job are written to job document 216. In some embodiments, the job document is a representation of the execution of the task. The execution is associated with a set of states. In various embodiments, the progress states include:

That the job is queued

When the job is being executed, the document is updated to indicate that the job is in the state of being executed.

When the job is completed, the job document is updated to indicate that the progress of the job has moved into a done state.

In some embodiments, the batch worker, as it proceeds through the various steps of the computation, tracks the progress of the job and updates the execution progress document with a flag or other indication of what state the computation is in. For example, when a worker sends Ack 224 to message queue 120 indicating that the job is done, the worker also updates the job document 216 in data store 112 with the new state of the progress. For example, the batch worker writes progress update 230 to data store 112. This includes writing and updating the job document for the job with updates such as what step the execution is in.

As will be described in further detail below, the job document may also be used to provide feedback to the client if the user of the client wishes to monitor the job as it is being performed.

Providing Feedback on the Progress of Workflow Execution

In this example, portion 220 of the call flow also illustrates an embodiment of a monitoring and feedback call flow. For example, in some embodiments, the geospatial data workflow platform provides a "watch" API that allows a user to receive feedback on a job and to see how the workflow job is progressing. As described above, in some embodiments, when a job is requested, a job document is created in data store 112, where the job document represents the execution of the AST representation of the workflow. The job document is updated with the state of progress of the job. In this example, the watch API is configured to watch for updates to the job document 216, which are then passed to the client.

In some embodiments, when a user submits a job to compute their workflow, they are provided two ways by which to call the workflow execution API. One way is for the user to have their workflow executed in the background, where the user will check on the results later.

As another example, the user may call the API in a manner where they wait until the result is returned. When the user wishes to wait for the result, the "watch" API provides live updates regarding the execution of the workflow. In this example, suppose that Bob would like to wait until the result is returned and would like to be kept apprised of the progress of the job execution.

As described above, in some embodiments, as the batch worker processes the AST representation of Bob's workflow, the batch worker writes progress reports back to the job document 216 in data store 112. For example, the steps (or a subset of the steps) executed by the batch worker are written back to the job document. The client device 102 accesses the job document. The progress of the workflow and its various stages are presented (e.g., via a terminal or other user interface). This provides feedback to Bob on the execution of his workflow.

In some embodiments, feedback is provided by updating the document. As described above, the job document streams updates from the running computation, including its current status, stage, and progress. In some embodiments, the client polls the job document/object to determine the changes and updates to the job state. When a change has occurred and is identified/detected (or the client is notified of an update, in some embodiments), the client then in turn provides an indication to the user about a change in progress of their workflow. That is, the progress updates in the job document are passed on to the client. For example, the progress updates are passed to the client via the API server 110.

As described above, in this example, results of the computation job are written to data store 112. When the job is completed, the job document is updated to indicate that the state of the job progress is now done. When the client determines, based on the job document, that the job is done, the client is directed to result store 122 to obtain the results for the job (e.g., by downloading the data bytes that represent that computation). In this way, the results of the computation are delivered from the backend to the client.

Thus, as described above, the platform 108 provides a degree of feedback to the users so that they are able to observe how their job is moving through the platform. In some embodiments, in addition to providing the state of the job of executing a workflow, the feedback system also breaks up the computation into portions. Based on which portion of the workflow representation is currently being executed, the platform determines what proportion or percentage of the job has been completed thus far. This percentage progress may be written to the job document. In some embodiments, the client is configured to render a representation of the job progress.

Versioning

The geospatial data workflow platform described herein also supports workflow versioning. For example, over time, Alice may continue to refine her workflow. As one example, suppose that Alice finds a bug in her workflow. Alice is able to add another version of that workflow to platform 108. Allowing versioning of workflows provides stronger robustness for other users of the workflow. For example, suppose that version 1 of Alice's workflow has the bug. Bob is using version 1 of the workflow (because he specifically referenced version 1 of Alice's workflow when incorporating her workflow into his), but does not hit the bug. Bob is able to continue to use version 1. Using the versioning described herein, workflows are logically updated without breaking Bob's use of version 1, even if Alice makes changes to the workflow and publishes them.

In some embodiments, when Alice publishes her workflow, in addition to having an associated workflow identifier, there is also a version number identifying the version of the workflow being published. When the workflow is stored at platform 108, it is stored as a new version of the workflow. For example, for a given workflow identifier, a list of versions is maintained. When a new version of the workflow is published, the new version is appended to the list of versions. For example, when Alice updates her workflow to address a bug that was found, a new version of the workflow is generated and appended to the list of versions. The previous versions are not modified. In some embodiments, an error is thrown if Alice tries to publish a version of a workflow that has the same version number as a workflow version that already exists.

Facilitating workflow versioning as described herein allows for a degree of robust backwards compatibility to be provided, where the workflows are immutable and unable to be changed. Once a version of a workflow is made, that version is not allowed to be changed. This is because another user may be relying on that particular version of the workflow (having referenced that specific version in their own workflow), and changing the version may change the behavior of that other user's workflow, without their knowledge.

In some embodiments, when a user wishes to update a workflow, they are required to publish the updated workflow as a new version of the workflow, with a new version number. In some embodiments all updates to workflows are forced to be a new version. For example, any time a workflow with a given identifier is published, it is stored with a new version number. In this way, the user is not allowed to edit a workflow in place (that is, the user is prohibited from modifying or editing a workflow that has already been published). Enforcing immutability of workflow versions prevents potentially breaking other workflows that are reliant on certain versions of the workflow.

In some embodiments, the aforementioned immutability of a workflow version is performed by making the workflow read-only, or by placing a lock on the workflow version, once created, to prevent editing. In some embodiments, locking the workflow includes locking the workflow version's AST representation. By making a workflow version read-only, a user that is referencing that particular workflow version need not be concerned that their own analysis will shift from under them or that their results will change suddenly, or that their workflow will no longer work, even if a new version of the workflow is published. This allows for the combining of workflows that have dependencies on one another, and protects against breakage of dependent workflows as well.

Although previously published versions of a workflow are prohibited from being edited, in some embodiments, specific versions may be de-activated. For example, from a privacy standpoint, Alice may de-commission a particular version and prevent other users from using that de-commissioned version (however, that version of the workflow cannot be overwritten).

Tile Service

Portion 128 of the workflow environment of FIG. 1 illustrates an embodiment of a tile service or sub-system for handling tiles. For example, the workflow management techniques described herein include two components. One component is asynchronous geospatial workflows, such as the batch workflow processing described above, where asynchronously executed computations will complete in the background, without blocking (in some embodiments, blocking is allowed until the result is available). The second component corresponds to a feature related to providing live results, such as providing/serving and allowing for viewing of image tiles dynamically, and on-the-fly. Such tiles include raster images that are served on a map displayed to users. As will be described in further detail below, using the tile service described herein, live visualizations on an interactive map are facilitated.

Portion 128 of FIG. 1 illustrates an embodiment of an alternate path into the geospatial data workflow platform that utilizes the workers and infrastructure described herein to facilitate live workflow execution and tile processing. Here, rather than computing a job and downloading bytes, endpoint 106 is used to service tiles, where for example, the map tiles may represent the result of execution of the workflow.

As one example, suppose that a user is viewing Landsat imagery. The user also has a workflow that cloud masks the imagery. Tile widget 106 of client 102 is used to provide the cloud-masked view of the tiles in real-time, for example, as the user pans over imagery in a graphical user interface (GUI). As the user manipulates the map built using such image tiles, the workflow identifies clouds as the user pans.

In this example, the workflow takes as input a geo-context, such as an area of interest. Here, for example, as the user pans, the user's current location (e.g., mouse location or finger location or other location indicator) points to a tile that defines the location or area of interest. The tile location is then automatically provided to the cloud-mask workflow as an input, which then serves/provides the cloud-masked tile in return. This allows the user to view a map live that dynamically has the cloud-masking applied.

Thus, in this example, the underlying cloud-mask workflow is used, and as the user pans around a map, the input to the function is continuously updated, where the cloud-mask function is repeatedly being called with the updated input area of interest (corresponding to wherever the user is currently on the map). The map is then rendered with the cloud-masking having been applied in real-time.

Thus, the sub-system tile processing 128, combined with the workflows processing architecture described herein, provides flexibility in defining workflows with inputs such as tiles. Here, a workflow has been defined that takes as input a geo-context. That workflow is saved or persisted as described above. The user may then use the tiles endpoint 106 to pan around a map and have the cloud-mask workflow called continuously as they move around the map (where their new position triggers calling of the function again with a new geo-context input corresponding to the user's position).

In some embodiments, the tile service described herein is a non-asynchronous version of the batch worker that is primarily configured for handling synchronous requests that are coming from a map widget (where results are to be provided immediately, rather than at a later time). As the user pans around a map, continuous requests are made to the tile service to provide a relevant portion of the map for rendering, where in this case, what is provided as output and rendered is a result of applying a workflow that performs a computation on the imagery to be rendered. That is, the results of the workflow computation are a type of imagery that will be rendered via the map widget. Here, the geographic area of interest that is passed in as input to the workflow function is based on where the user is panned or zoomed into in a UI. For example, as the user pans on the map, a new input is provided to the underlying workflow function, where a new image is computed on the backend and then served back immediately to the client. As the user pans across the map, new calls are made for the workflow function with different inputs. Thus, as the user scrolls around the map, new image tiles processed by the underlying function are returned from the backend and served and displayed on the client.

As shown in this example, the tile service provides a second way to interact with the geospatial data workflow platform. Here, the results of computation requests are provided synchronously with the requests, in real-time (e.g., as the user drags a map to the left, new imagery based on the workflow appears very quickly after that).

The batch worker portion of the architecture described above provides an asynchronous service that facilitates handling requests for larger, longer-running computations to be performed, where the batch worker provides results as they are available, and need not provide the results in real-time.

The tile service 124 described herein is an example of synchronous workflow processing. In this example, worker 126 is the same type of worker as worker 130 of batch worker 180, but with smaller computations that are performed more quickly in order to provide results as soon as possible.

In some embodiments, the tiles service/system 124 is a subset of the more general-purpose batch system described above, and is a specialized or optimized path for serving or returning geospatial images (e.g., a more specialized call of the same infrastructure). The separate tile system allows for rapid interactivity and requests for which results are to be provided as soon as possible.

As shown in the above examples, platform 108 provides multiple paths into a same underlying evaluation system, where one path (e.g., using tile service 124) is for immediate feedback and results, while the other path is for computations where the results are provided as available (e.g., using batch worker 130).

Example Worker

Figure 3:
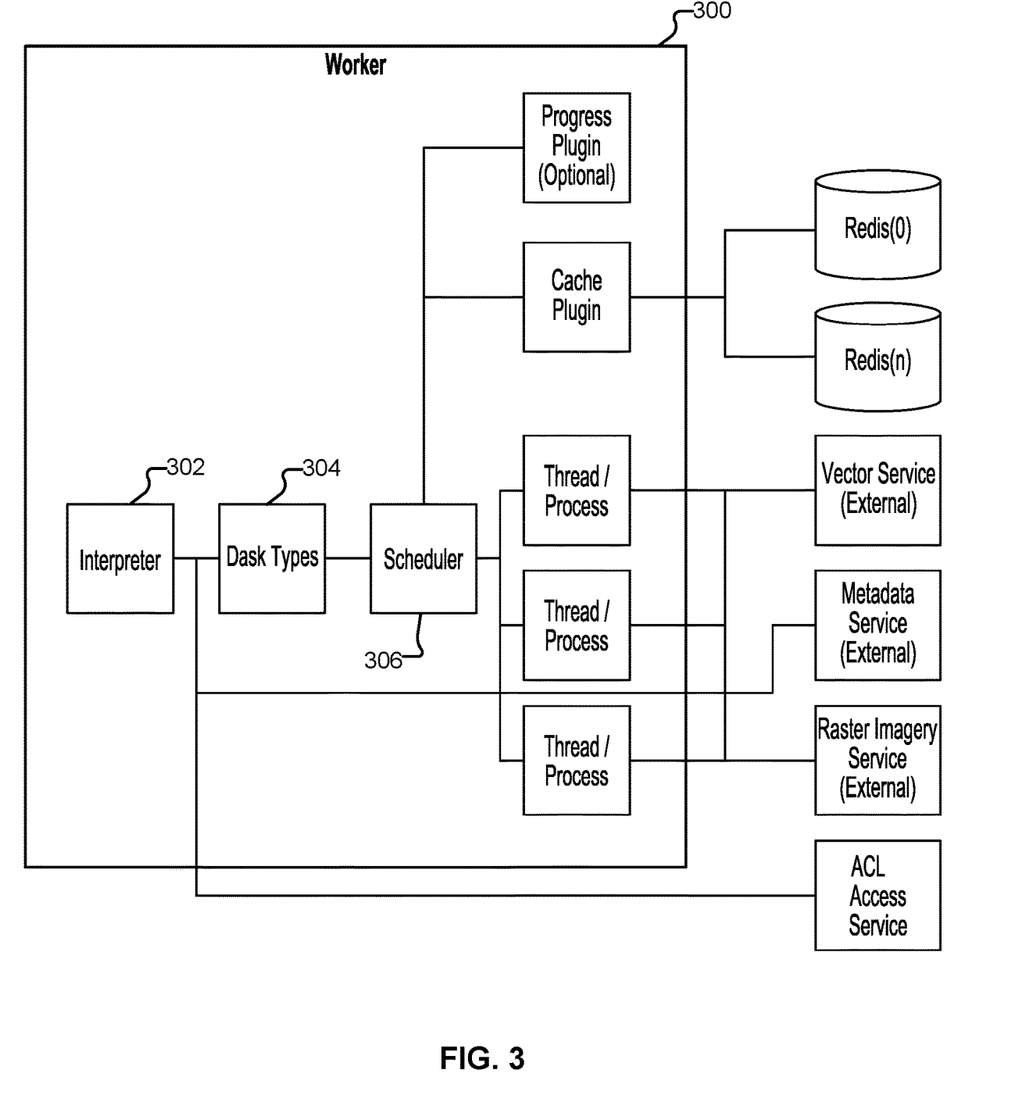
FIG. 3 illustrates an embodiment of a worker.

FIG. 3 illustrates an embodiment of a worker. In this example, worker 300 is an example of workers 130 (of batch worker 118) and worker 126 (of tiles service 124) of FIG. 1. As one example, the worker is implemented using Dask. Other distributed computation frameworks may be used. In this example, worker 300 is configured to take the AST representation of a workflow, combine it with any input parameters, and compute a result.

As shown in this example, the worker includes an interpreter 302. As described above, in some embodiments, the AST representation of the workflow is generated by the Python client. The worker may be implemented using another language or machine architecture. The interpreter is configured to interpret the representation of the workflow into a form that is executable by the worker. In this example, the interpreter is configured to take the AST graph representation of the workflow and its inputs, and convert it to a set of Dask types of operations 304, which are then passed to scheduler 306 for execution. The interpreter provides a mapping between the workflow representation and the implementation of the worker. Different interpreters may be used for different types of workers.

In some embodiments, the computation result is written to a results data store (e.g., result store 122). For example, raw bytes are written to a storage bucket, which is then downloaded by a user. In some embodiments, as described above, a tile service is provided. If the tile service is used, the output of the function is a tile that is in a format that is able to be visualized on a map. Further details regarding the tile service are described above.

In some embodiments, the worker is executed in both batch worker 130 and tile worker 126 with different parameters and guarantees for reliability and progress tracking.

Additional Example Geospatial Data Workflow Scenarios

The following are additional examples in which the geospatial data workflow techniques described herein are used.

Mining Example

A mining company may be very protective of their data and what areas of interest they are looking at. Suppose the mining company has a workflow for determining how to find a mineral without revealing to anybody the location that the mining company is looking at. In this example, the mining company may publish the mineral-finding workflow, but only share it in the "execution-only" mode, preventing users from viewing the implementation of the workflow (where the workflow code may include a set of areas of interest), such that the locations that the mining company is looking at are not divulged.

Intra-Company Geospatial Data Workflow Sharing

The following is an example scenario in which the workflow sharing techniques described herein are utilized intra-organization. Suppose that Charlie, a data scientist with Acme Company, develops a workflow (WF1) that can calculate forest carbon and publishes it such that it can only be accessed within Acme Company (e.g., the Access Control Entry for WF1 indicates that only those email addresses that have an Acme Company domain are permitted to access WF1). Dan, a business expert tracking the company's carbon footprint identifies an AOI (Area of Interest) that Acme Company is involved in and builds on top of WF1 to create a new workflow (WF2), which calculates forest carbon within that AOI. Note that in this example, WF2 relies on WF1. Next, Dan wants to track forest carbon since they bought the land from another entity, so they publish workflow WF3, which gives a time series of forest carbon (WF1) for a given AOI ((WF2) over a given time range). In this example, WF3 references WF1 and WF2. In this example, suppose that it is determined that the forest carbon has gone up and Acme Company claims claim carbon credits. However, Acme Company is then audited by the Carbon Credit Police who believe that they have deforested that AOI. However, all of these workflows are saved and immutable, and there is a paper trail that has been recorded. Suppose that Charlie realizes that they forgot about the importance of clouds in geospatial imagery and needs to improve WF1 to include a cloud mask, so Charlie updates WF1 with a new version, WF1.1 (e.g., using the versioning described above). Dan now updates WF2 to use WF1.1 and publishes WF2.1, and then updates WF3 to rely on WF2.1, thus publishing WF3.1. The various versions are maintained using the workflow versioning described herein. Suppose that based on the new workflow versions, it is determined that forest carbon actually went down, but because there is a paper trail of the versions of the workflows, Acme Company is allowed off with a warning.

Workflow Marketplace

The following is an example of a workflows marketplace supported by the geospatial data workflow platform described herein. In this example, suppose that an operator of the geospatial data workflow platform has a set of core workflows that are common to geospatial analyses, and these are shared with all users of the workflow platform. In addition to the core workflows, the operator has a Workflows Marketplace. There is also a set of premium workflows shared with users who purchase a yearly subscription to utilize the services of the geospatial data workflow platform. In this example, suppose that Acme Company buys a year-long subscription to the operator's premium workflows so they can build workflows that reference premium workflows. If they do not renew their subscriptions, those premium workflows no longer work after a year. The access privileges and subscription may be stored in an access control entry, as described above. In some embodiments, the marketplace is also a location where community members can sell workflows to other community members, knowing that the sharing mechanisms described herein protect intellectual property, through both hiding the dependency graph/AST representation (e.g., by setting different access modes, as described above) that describes the workflow during the subscription, and cutting access (either direct or by reference through another workflow) to the workflow after the subscription.

Figure 4A:
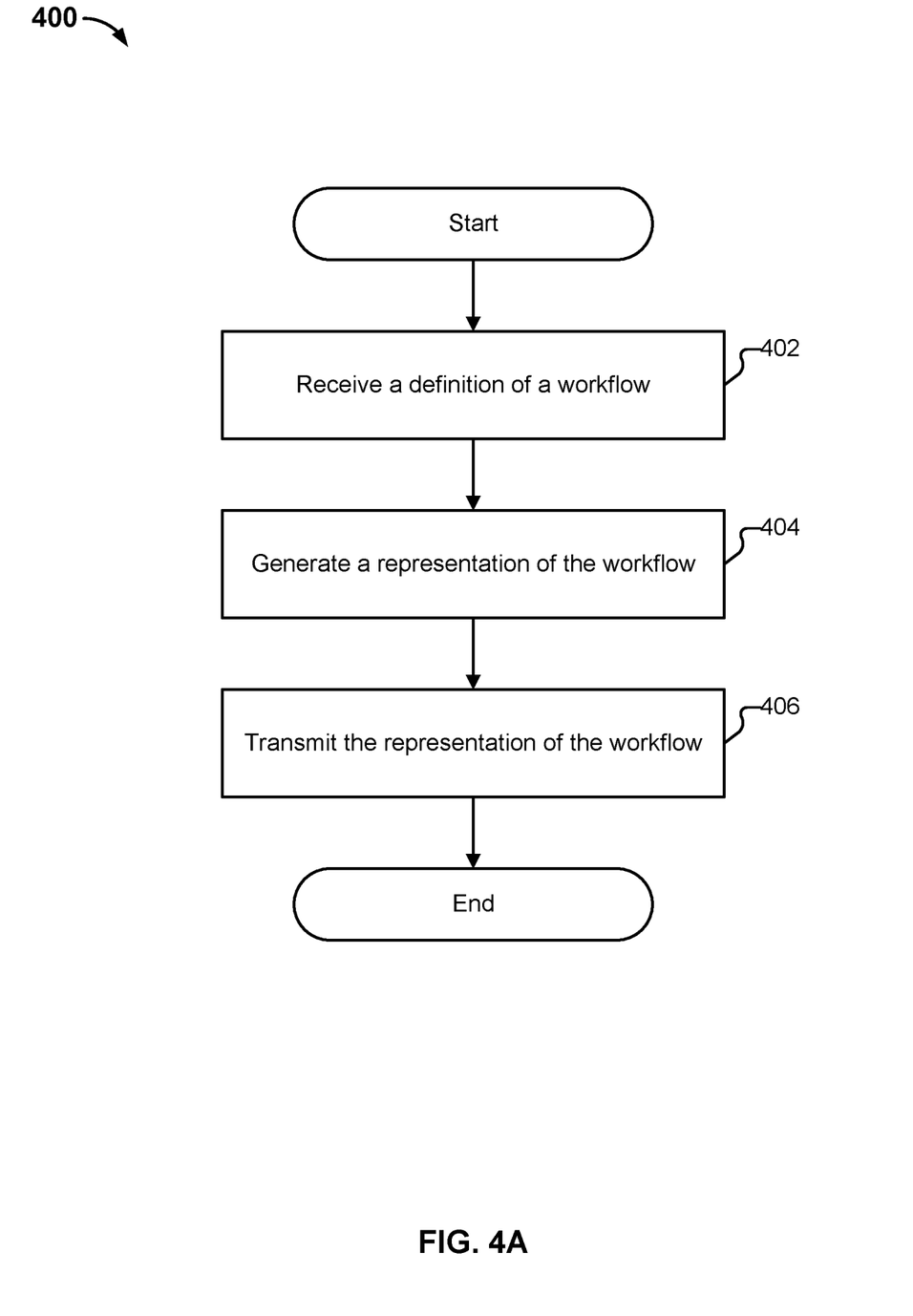
FIG. 4A illustrates an embodiment of a process for publishing a workflow.

FIG. 4A illustrates an embodiment of a process for publishing a workflow. In some embodiments, process 400 is executed by client 102 of FIG. 1. The process begins at 402, when a definition of a workflow is received. For example, code written in a language such as Python is received. In some embodiments, the workflow is a geospatial data workflow that includes geospatial transformations and operations on data such as satellite imagery. At 404, a representation of the workflow is generated based on the workflow definition. For example, an AST representation of the workflow is generated (e.g., by converting the Python code to the AST representation). At 406, the representation of the workflow is transmitted. For example, the representation of the workflow is transmitted to platform 108 in response to a user of the client making a request to publish their workflow. In some embodiments, sharing parameters pertaining to the workflow that are defined at the client are also transmitted to the backend. For example, a user of the client may indicate that they would like to share their workflow with other users. The sharing request may be made at the time of publishing, or at a subsequent time, and may be changed over time. The user may specify different levels of sharing, such as private sharing and public sharing, as described above. Various other access permissions, such as those described above, may be defined.

Figure 4B:
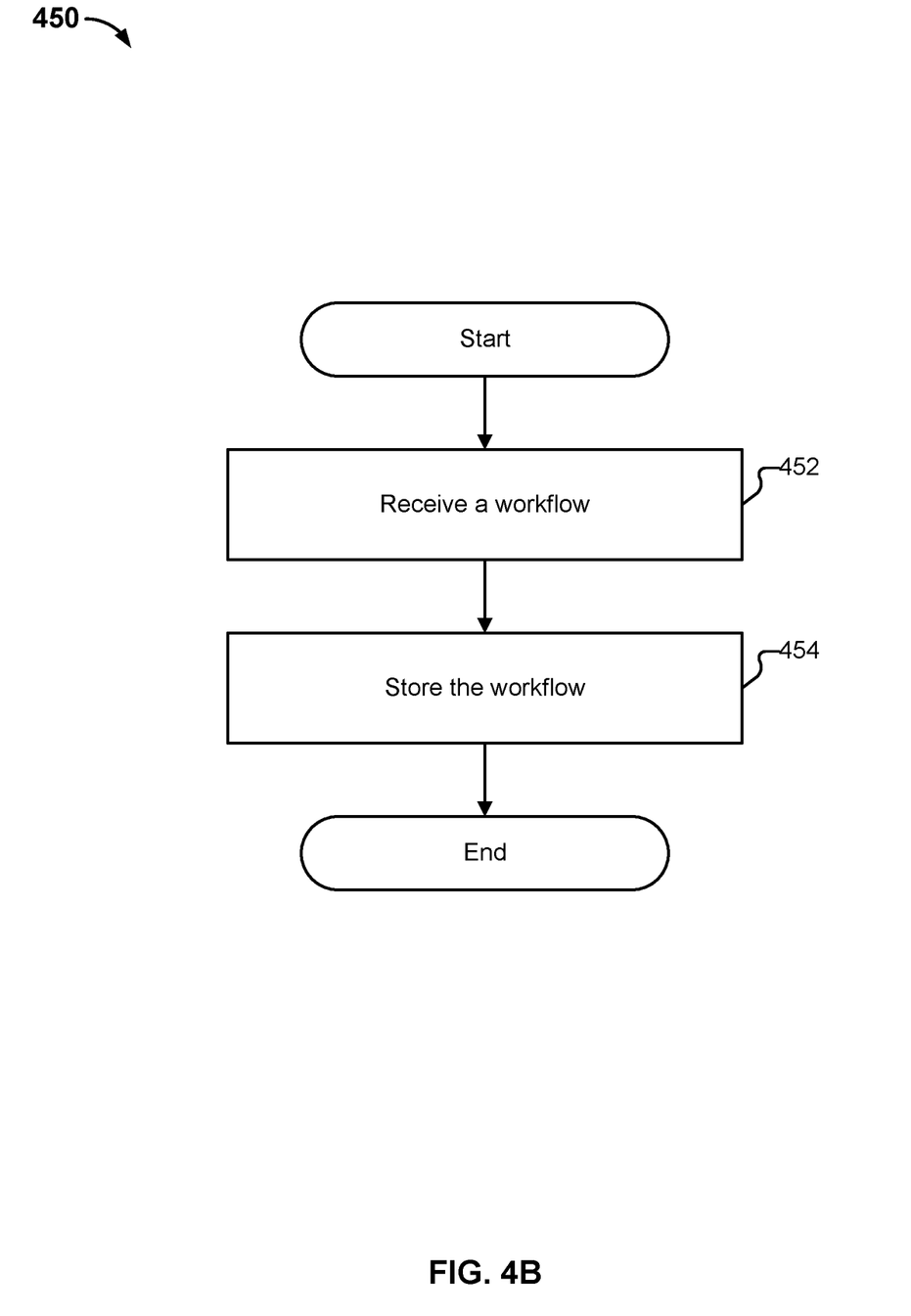
FIG. 4B illustrates an embodiment of a process for publishing a workflow.

FIG. 4B illustrates an embodiment of a process for publishing a workflow. In some embodiments, process 450 is executed by platform 108 of FIG. 1. The process begins at 452, when a workflow is received. For example, the workflow is received from a client such as client 102 of FIG. 1. In some embodiments, a representation of the workflow (e.g., AST representation) is received. For example, the AST representation is generated from code at the client, as described above in conjunction with process 400 of FIG. 4A. In other embodiments, the code for the workflow (e.g., written in a programming language such as Python) is received from the client, and the data structure representation of the workflow is generated by platform 108.

In some embodiments, the workflow received at 452 is received in conjunction with a request to publish the workflow. At 454, the workflow is stored (e.g., in response to the publishing request). If sharing parameters are also specified for the workflow (e.g., as part of a sharing request), in some embodiments, an entry for the workflow is also generated and persisted to an access control data store, as described above. For example, the entry for the workflow includes a list of users or entities allowed to access the workflow (where those users may be identified via user identifiers such as email addresses, nicknames, screennames, etc., where organizations may be defined by domains, etc.), as well as what access privileges those users or entities have with respect to the workflow (e.g., private versus public sharing). In addition to specifying access on an individual level, access may also be specified at higher levels, such as group or organization levels.

As described above, in some embodiments, versioning is performed or facilitated. For example, a user, when publishing their workflow, specifies a version number for the workflow being published. In other embodiments, the client or platform automatically determines a version number for the workflow (e.g., based on a determination of what previous versions of the workflow with the same workflow identifier exist). The backend is configured such that previous versions of the workflow, which may be referenced by other workflows, are immutable and are not overwritten by the new version of the workflow. Further details regarding versioning are described above.

Figure 5:
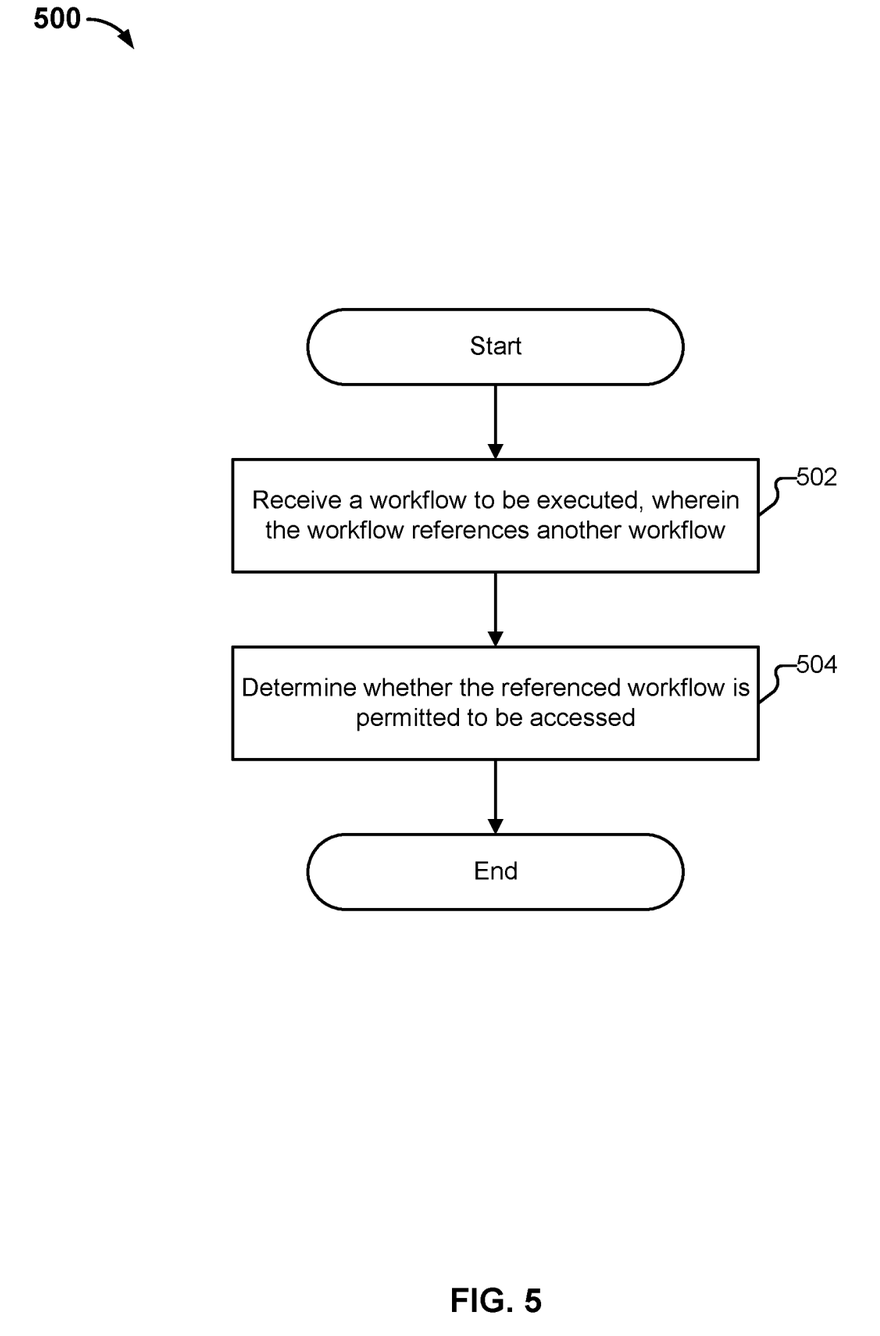
FIG. 5 illustrates an embodiment of a process for executing a workflow.

FIG. 5 illustrates an embodiment of a process for executing a workflow. In some embodiments, process 500 is executed by platform 108 of FIG. 1. The process begins at 502, when a workflow to be executed is received. For example, as described above, a job request is received from a client device. In some embodiments, a representation of a workflow is received (e.g., abstract syntax tree representation of code written by the user that composed the workflow to be executed).

If the workflow to be executed includes a reference to another workflow, then at 504, an access check is performed to determine whether the referenced workflow is permitted to be accessed for this job. This includes checking an access control entry for the referenced workflow to determine whether, for example, the entity requesting execution of the workflow to be executed is permitted to access the referenced workflow. The access permissions to the referenced workflow may be based on sharing parameters such as those described above. If access to the referenced workflow is granted, then as part of executing the workflow received at 502, the referenced workflow is also executed. If access is not granted, then the referenced workflow is not executed. In some embodiments, a notification is sent to the entity that requested the workflow execution that they are not permitted to access the referenced workflow. The check may be performed prior to execution of the workflow to be executed, or as the workflow is being executed.

As described above, the author of the workflow received at 502 may reference the other workflow by adding a "use" call with an identifier of the referenced identifier. As also described above, workflow composers may search for other workflows to include in their workflows via various interfaces. Marketplaces of workflows may be provided. Users may also search for workflows from a list or set of workflows that have been shared with them by other users. A host of the marketplace may also be a creator/sharer of workflows.

In some embodiments, execution of the workflow is monitored. For example, the progress of the workflow execution job is monitored and recorded. Further details regarding workflow execution monitoring are described above. Feedback may also be provided based on the progress monitoring/tracking, as described above.

The geospatial data workflow techniques described herein provide various benefits. As one example, in contrast to the workflow being computed on a user's local device, execution of the workflow is performed by the backend.

This has performance benefits. For example, the workflows are evaluated in the backend infrastructure such that it is closer to the data (e.g., satellite imagery) to be operated on. In this way, the computations may be performed more quickly and efficiently. This is in contrast to existing geospatial and machine learning tools, where users typically operate on data on their own local devices.

Further, using the techniques described herein, the data that is operated on, such as pixel values for satellite images, is not transmitted over the network to clients for processing. Rather, it is the definition or description of programs defined by the workflows that is transmitted between the client and the backend. Sending a representation of the user-written workflow code is relatively lightweight to send, thereby reducing the amount of network traffic when performing workflow computation. The workflow may then be evaluated with large amounts of data that is close to the where the computation is being performed (e.g., at the platform).

This is in contrast to existing techniques for geospatial analysis, which require that clients, which are performing the analysis locally, to download large amounts of data (e.g., petabytes of image data).

The workflow composition and sharing techniques described herein also provide advantages with respect to flexibility as well. Traditionally, to run a geospatial analysis over a new area of interest, a user would have to locally download all of the pixels for images relevant to an area of interest to execute the analysis locally. Using the techniques described herein, as the pixel image data is stored on the backend, where the computation is also executed, a user need only change an input parameter (e.g., new area of interest) on a workflow as defined herein, and the new results can be immediately obtained and returned.

Further, the geospatial data workflow techniques described herein provide improved privacy of workflow implementation. For example, by providing various levels of access permissions with respect to a workflow, a user is able to control what level of detail of their workflow they would like to share with others. For example, a user may publish a workflow and allow other users to use it, without exposing to others how the workflow is implemented or having to publish the steps that were taken for a certain analysis.

Thus, the geospatial data workflow techniques described herein, which allow for expression of complex geospatial operations in a higher-level domain, as well as co-locating execution of workflow computation to the data, facilitate the various benefits described above with respect to processing efficiency and speed, as well as reduction in network traffic (e.g., where image data need not be passed back and forth to client devices to be operated on locally at the client). Further, the geospatial data workflow techniques described herein facilitate privacy, by allowing users to select different permissive modes for sharing of workflows, so that undesired exposure of workflow implementation details is prevented.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
store a representation of a first workflow comprising a serialized sequence of operations usable to perform one or more geospatial transformations, wherein the representation of the first workflow comprises an abstract syntax tree (AST) representation generated at least in part by converting code in which the first workflow was composed;
receive, from a remote client, a request to execute a second workflow, the second workflow including a reference to the first workflow;
determine, at least in part by performing an access check, that the first workflow referenced by the second workflow is permitted to be accessed; and
based at least in part on determining that the first workflow is permitted to be accessed, execute the second workflow, including:
retrieving the stored representation of the first workflow referenced by the second workflow; and
executing the representation of the first workflow at least in part by providing, as input to the first workflow, a geo-context specified in the second workflow, the geo-context comprising at least one of an image data set, an area of interest, a resolution, or a set of frequency bands; and
a memory coupled to the processor and configured to provide the processor with instructions.

2. The system of claim 1, wherein at least one geospatial transformation operation is usable to transform image data.

3. The system of claim 1, wherein performing the access check comprises receiving access control metadata pertaining to the first workflow.

4. The system of claim 3, wherein the access control metadata pertaining to the first workflow comprises a permitted access mode for an entity.

5. The system of claim 4, wherein the permitted access mode comprises a private access mode, wherein in the private access mode:
referencing of the first workflow is permitted; and
a code implementation of the first workflow is hidden.

6. The system of claim 4, wherein the permitted access mode comprises a public access mode, wherein in the public access mode:
referencing of the first workflow is permitted; and
a code implementation of the first workflow is viewable.

7. The system of claim 1, wherein executing the second workflow comprises executing a dependency graph representing a set of operations including the serialized sequence of operations included in the representation of the first workflow referenced by the second workflow.

8. The system of claim 1, wherein the processor is further configured to monitor a progress of execution of the second workflow.

9. The system of claim 8, wherein the processor is further configured to provide, to the remote client, a status update with respect to execution of the second workflow.

10. The system of claim 8, wherein the first workflow comprises a new version of an existing workflow, and wherein the processor is further configured to include the new version in a set of versions of the existing workflow, and wherein a previous version of the existing workflow is read-only.

11. The system of claim 1, wherein the processor is further configured to provide, as output, an image tile.

12. The system of claim 11, wherein the image tile is provided as output to the remote client, and wherein the remote client is configured to render the image tile.

13. A method, comprising:
  storing a representation of a first workflow comprising a serialized sequence of operations usable to perform one or more geospatial transformations, wherein the representation of the first workflow comprises an abstract syntax tree (AST) representation generated at least in part by converting code in which the first workflow was composed;
  receiving, from a remote client, a request to execute a second workflow, the second workflow including a reference to the first workflow;
  determining, at least in part by performing an access check, that the first workflow referenced by the second workflow is permitted to be accessed; and
  based at least in part on determining that the first workflow is permitted to be accessed, executing the second workflow, including:
    retrieving the stored representation of the first workflow referenced by the second workflow; and
    executing the representation of the first workflow at least in part by providing, as input to the first workflow, a geo-context specified in the second workflow, the geo-context comprising at least one of an image data set, an area of interest, a resolution, or a set of frequency bands.

14. The method of claim 13, wherein at least one geospatial transformation operation is usable to transform image data.

15. The method of claim 13, wherein performing the access check comprises receiving access control metadata pertaining to the first workflow.

16. The method of claim 15, wherein the access control metadata pertaining to the first workflow comprises a permitted access mode for an entity.

17. The method of claim 16, wherein the permitted access mode comprises a private access mode, wherein in the private access mode:
  referencing of the first workflow is permitted; and
  a code implementation of the first workflow is hidden.

18. The method of claim 16, wherein the permitted access mode comprises a public access mode, wherein in the public access mode:
  referencing of the first workflow is permitted; and
  a code implementation of the first workflow is viewable.

19. The method of claim 13, wherein executing the second workflow comprises executing a dependency graph representing a set of operations including the serialized sequence of operations included in the representation of the first workflow referenced by the second workflow.

20. The method of claim 13, further comprising monitoring a progress of execution of the second workflow.

21. The method of claim 20, further comprising providing, to the remote client, a status update with respect to execution of the second workflow.

22. The method of claim 20, wherein the first workflow comprises a new version of an existing workflow, and further comprising including the new version in a set of versions of the existing workflow, and wherein a previous version of the existing workflow is read-only.

23. The method of claim 13, further comprising providing, as output, an image tile.

24. The method of claim 23, wherein the image tile is provided as output to the remote client, and wherein the remote client is configured to render the image tile.

25. A computer program product embodied in a non-transitory computer readable storage medium and comprising computer instructions for:
  storing a representation of a first workflow comprising a serialized sequence of operations usable to perform one or more geospatial transformations, wherein the representation of the first workflow comprises an abstract syntax tree (AST) representation generated at least in part by converting code in which the first workflow was composed;
  receiving, from a remote client, a request to execute a second workflow, the second workflow including a reference to the first workflow;
  determining, at least in part by performing an access check, that the first workflow referenced by the second workflow is permitted to be accessed; and
  based at least in part on determining that the first workflow is permitted to be accessed, executing the second workflow, including:
    retrieving the stored representation of the first workflow referenced by the second workflow; and
    executing the representation of the first workflow at least in part by providing, as input to the first workflow, a geo-context specified in the second workflow, the geo-context comprising at least one of an image data set, an area of interest, a resolution, or a set of frequency bands.

* * * * *